March 10, 1964  J. S. NEAL  3,124,515
PLATE FUEL ELEMENT ASSEMBLY FOR A NUCLEAR REACTOR
Filed Oct. 16, 1959

INVENTOR.
JACKSON S. NEAL
BY
Arthur M. King
AGENT.

United States Patent Office 3,124,515
Patented Mar. 10, 1964

3,124,515
PLATE FUEL ELEMENT ASSEMBLY FOR A NUCLEAR REACTOR
Jackson S. Neal, Baltimore, Md., assignor to Martin-Marietta Corporation, a corporation of Maryland
Filed Oct. 16, 1959, Ser. No. 846,961
3 Claims. (Cl. 176—75)

This invention relates to fuel elements for nuclear reactors, particularly plate fuel element assemblies, and a method for fabricating same.

Plate fuel elements, either flat-type or curved, are conventionally brazed in parallel relation between two side plates to form metallurgically bonded assemblies. At temperatures used in brazing both the fuel elements and side plates often deform. The elements can usually be straightened manually, but side plates must be machined to remove warpage. When warpage cannot be machined out, the whole assembly is scrapped. It has also been observed that fuel elements frequently blister during the brazing operation, which renders the assembly useless, since this condition cannot be remedied. With regard to its effect on the nuclear properties of a fuel element assembly, the brazing filler introduces "poison" materials, that is, elements having relatively high neutron absorption cross sections, into the brazed joint. Poisons in a neutronic reactor reduce the number of neutrons available for fission, and, therefore, their presence in a fuel assembly is highly undesirable. As concerns structural capability, fuel element assemblies constructed from metals such as 1100 and 6061 aluminum, and 304, 316 and 347 stainless steel, which have been hardened by heat treatment or working, are reduced to the fully annealed condition by brazing, thereby experiencing a marked reduction in mechanical strength. In addition to the foregoing limitations of fuel assembly brazing, it is well known that substantial amounts of corrosive substances constituting the brazing flux, for example, salts containing fluoride or chloride ion, are left in the brazed joint, and are leached out when the assembly is exposed to reactor coolant. Unless these substances are removed from the coolant, they will injure the reactor.

It is an object of the present invention, therefore, to eliminate the aforementioned disadvantages associated with brazed fuel elements. There is provided a stronger and more reproducible fuel element assembly substantially free of nuclear "poisons" and corrosive substances, which is fabricated without distorting the fuel elements or side plates, with the result that production efficiency is greatly increased and a structure much improved in mechanical integrity and operation is obtained.

According to the present invention a plurality of plate-type fuel elements are arranged edgeways in spaced relation between two face-opposed side plates. As will be explained in more detail below, both the fuel elements and side plates are provided with coactive grooves adapted to receive a key engageably insertable therein so as to join the fuel elements rigidly to the side plates. In this manner the assembled components retain their initial metallurgical properties, and deleterious matter is excluded from the assembly. Plate fuel element assemblies joined according to the present invention are free from distortion and warping because the components are not subjected to excessive distorting forces, such as thermomechanical stresses experienced during brazing. It will be obvious that blistering of the fuel elements is completely eliminated by means of the present method of joining, which does not expose the fuel elements to elevated temperatures.

After the plate fuel elements, side plates and keys have been assembled in proper relationship to each other, the keys are securely bonded to the side plates, for example, by tack welding, thereby avoiding the use of solders and flux which would introduce foreign matter that ordinarily prove to be deleterious to reactor operation.

In order to afford a better understanding of the present invention, reference is made to the following detailed description, to be taken in conjunction with the drawings wherein.

Figure 1:
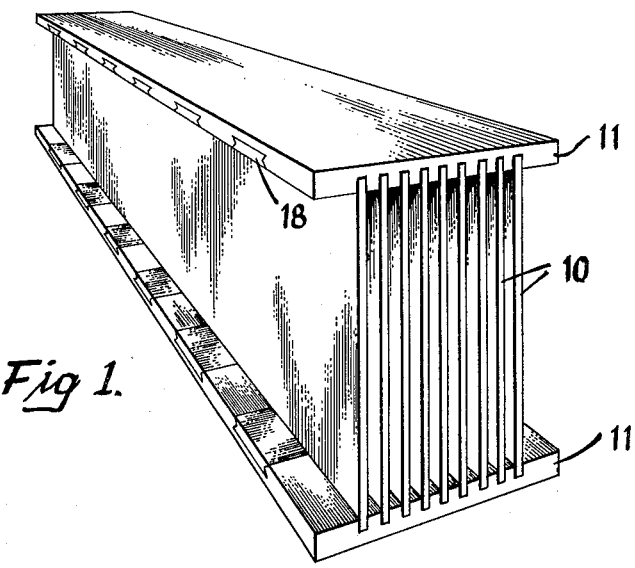
FIGURE 1 is a perspective view of a plate fuel element assembly according to this invention.
Figure 2:
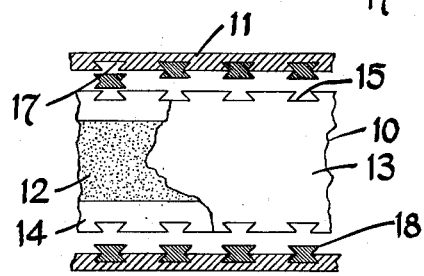
FIGURE 2 is an exploded vertical section taken along line 2—2 of FIGURE 3, partially cut away to show internal structure of a fuel element.

Referring first to FIGURES 1 and 2, a plate fuel element assembly is shown wherein a set of parallel flat plate fuel elements 10 are disposed edgeways between two side plates 11. Fuel elements 10 may be of conventional design, such as is illustrated and described in U.S. Patents 2,813,073 and 2,820,751 to Saller et al. Basically, fuel element 10 comprises an inner layer or coupon 12 of fissionable material encased in a suitable metal sheathing made up of outer sheets 13 and 14. Sheets 13 and 14 extend beyond the edges of the coupon 12 so as to provide an edging of non-fissionable material which may be used for attaching fuel element 10 to other structure without exposing fissionable material 12 to the external environment. Sheets 13 and 14 are ordinarily bonded to each other throughout the edging area and are each bonded to coupon 12 by, for example, hot rolling. For the purposes of the present invention, however, it is only necessary that fissionable material 12 be sealed off from the external environment after grooves, such as at 15, have been machined or punched in the edging portion of fuel element 10. One way of accomplishing this sealing without completely bonding sheets 13 and 14 to each other is to place a seam weld along the length of fuel element 10 between coupon 12 and grooves 15. Any other conventional sealing method may be used, provided fuel element 10 may be notched without unsealing the fissionable material-bearing section.

Reference is also made to an article entitled "MTR-Type Fuel Element," appearing at pages 203 to 207 of volume 9 of the Proceedings of the International Conference on Peaceful Uses of Atomic Energy (1955), which shows a plate fuel element of the type described and a typical brazed fuel element assembly, wherein the fuel elements are curved rather than flat. Plate fuel elements, per se, both flat and curved, are well known in the prior art, and are not a part of this invention, which is directed, rather, to a novel manner of joining said elements in a rigid assembly for use in a nuclear reactor.

In order to maintain elements 10 in spaced relation, spaced longitudinal notches or grooves 16 are conventionally provided in the facing surfaces of side plates 11 to receive the edges of elements 10 in close fit. The notches or grooves 16 may be cut at an angle normal to the plane of each side plate 11 or obliquely, depending upon whether flat plate or curved plate elements are used, respectively. When the assembly is constructed from flat plate elements, notches 16 are oriented perpendicularly to side plates 11 as shown in the drawing. When curved elements are used, the notches or grooves 16 are disposed obliquely to the plane of the side plate so as to receive the elements without bending them at the edges.

Figure 3:
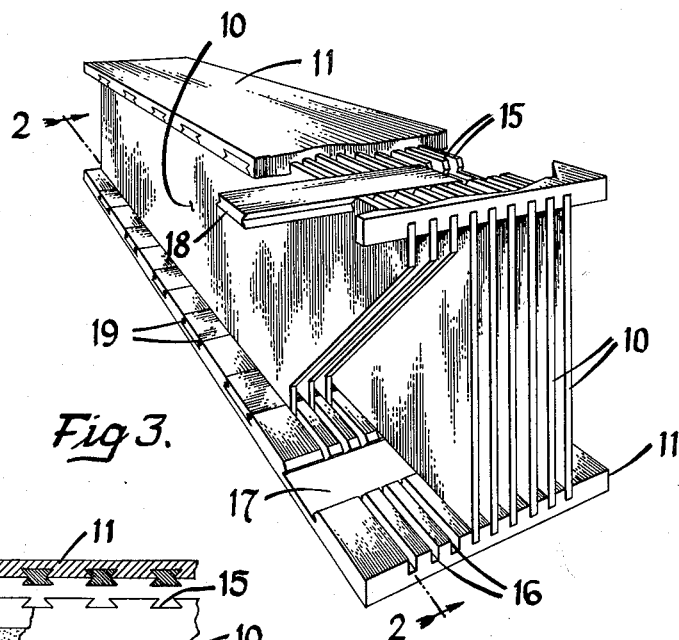
FIGURE 3 is a partially cut away perspective view of the fuel element of FIGURE 1 with one key partly withdrawn and one key removed from the assembly.

Elements 10 and side plates 11 are rigidly joined together by means of a key arrangement designed to interlock these components mechanically. As shown in FIGURE 3, fuel elements 10 have a series of grooves 15 on their long edges, shaped such that a key inserted therein will be restrained by the sides of the grooves, and have no freedom of motion in the direction of the plane of the fuel element. Complementary grooves 17, also of a key-retaining configuration, are provided on the opposed surfaces of side plates 11 so as to be coactive with grooves 15 and form key-retaining ways. Grooves 17 may be cut at right angles or obliquely to notches 16. In the embodiment shown, grooves 15 and 17 are each in the form of a compound dovetail, consisting of two dovetails whose smaller bases are touching. Keys 18, also in the form of a compound dovetail are inserted into the way formed by grooves 15 and 17, and engage both fuel elements 10 and side plates 11, establishing a mechanical joint therebetween. After keys 18 have been inserted through the above-described keyways, they are secured to side plates 11 by means of tack welds, as at 19.

The embodiment of this invention shown in the drawing is susceptible to various modifications as will appear to persons skilled in the art. For this reason, the detailed description and drawing are given by way of illustration and not by way of limitation of the invention whose scope is defined in the appended claims.

What is claimed is:

1. A plate fuel element assembly for a nuclear reactor comprising two face opposed side plates, a plurality of plate fuel elements supported by and essentially disposed edgeways between said side plates, said side plates having on their facing surfaces a plurality of spaced first grooves in opposed spacial alignment and adapted to receive in each the outward edge of a said spaced plate fuel element, said side plates having a plurality of spaced dovetail shaped second grooves intersecting and normal to said spaced first grooves, said plate fuel elements having a plurality of spaced dovetail shaped grooves disposed on the outward edges thereof so as to be aligned to form keyways with said spaced second grooves when disposed within said assembly, and keying means for engaging in said keyways to rigidly join said side plates and said plate fuel elements into a unitary structure.

2. The plate fuel element assembly of claim 1 wherein said keys are secured against movement in said keyways.

3. A plate fuel element assembly for a nuclear reactor comprising two face opposed side plates, a plurality of plate fuel elements supported by and essentially disposed edgeways between said side plates, said side plates having on their facing surfaces a plurality of substantially parallel spaced first grooves in opposed spacial alignment and adapted to receive in each the outward edge of a said spaced plate fuel element, said side plates having a plurality of substantially parallel spaced dovetail shaped second grooves intersecting said spaced first grooves, said plate fuel elements having a plurality of spaced dovetail shaped grooves disposed on the outward edges thereof so as to be aligned to form keyways with said spaced second grooves when disposed within said assembly, and keying means for engaging in said keyways to rigidly join said side plates and said plate fuel elements into a unitary structure.

References Cited in the file of this patent

UNITED STATES PATENTS

| | | |
|---|---|---|
| 224,486 | Spruce | Feb. 10, 1880 |
| 1,985,992 | Hayman | Jan. 1, 1935 |
| 2,981,673 | Johnson | Apr. 25, 1961 |
| 2,989,456 | Jesson | June 20, 1961 |
| 3,029,198 | Anderson et al. | Apr. 10, 1962 |
| 3,067,994 | Ronbeck | Dec. 11, 1962 |

OTHER REFERENCES

AEC Document NAA-SR-1934, in particular page 14.